Patented Dec. 21, 1943

2,337,338

UNITED STATES PATENT OFFICE 2,337,338

FLOOR PAVING AND LIKE COMPOSITION

Wilbert B. McCluer, Ralph W. Hufferd, and Frank J. Philippbar, Bradford, Pa., assignors to Kendall Refining Company, Bradford, Pa., a corporation of Pennsylvania No Drawing. Application August 3, 1940, Serial No. 351,182

5 Claims. (Cl. 106—285)

This invention relates to floor, pavement, and like compositions, and contemplates the provision of improved compositions for mastic floors and pavements as well as compositions applicable for the production of floor tiles, paving blocks, expansion joints, rail fillers, and the like.

One of the chief disadvantages of floor and paving compositions has been their tendency to deteriorate with age and to lose their cohesiveness and bonding properties, resulting in cracking, pulling away from base structures, and general deterioration.

An outstanding advantage of the compositions of the present invention resides in their inherent resistance to oxidation and their capacity to retain their original ductile and cohesive characteristics under severe conditions of use, throughout a wide variation in temperature conditions over prolonged periods.

Another outstanding advantage of the herein described compositions is their acid and alkali resistant property making them advantageous for use in laboratory floors and the like. Floor and paving compositions in accordance with the present invention retain their cohesive and adhesive properties at temperatures as low as −20° F. and do not deteriorate, pull away from their supporting base structures, or crack in use.

Heretofore certain asphalt bonded compositions have been proposed for the production of floor and pavement mastic compositions, as well as for the production of floor tile and paving blocks. However, such materials undergo oxidation to a marked degree and lose their original properties with the result that the composition pulls away from supporting base structures and cracks in use.

The basic constituents of the floor and paving composition contemplated for use in accordance with the present invention comprise paraffin base petroleum products which have undergone no thermal decomposition or chemical change other than occasioned by normal or vacuum distillation and derived from a crude oil containing not substantially in excess of 0.2% asphaltic like constituents (Holde method), and chemical condensation products thereof.

These paraffin base petroleum products comprise the high molecular weight naturally contained viscous materials that are precipitated from a warm solution (above 77° F.) of such paraffin base oil products in a hydrocarbon solvent which is gaseous at normal temperatures and which contains from two to four carbon atoms per molecule with a solvent-to-oil ratio in the solution of above about six to one as well as chemical condensation products thereof. These basic constituents are over 98% soluble in 88° Baumé naphtha, have a relatively low iodine number, are virtually free from asphaltenes, and possess a high degree of resistance to oxidation. Blends of these materials with compatible floor and paving constituents are also contemplated within the purview of this invention.

The paraffin base oil product may be a so-called "cylinder stock" or similar normal or vacuum distillation residual stock from a paraffin base crude, or a solvent separated wax, so long as the paraffin base oil from which it was derived has not been subjected to thermal decomposition or chemical change beyond that induced by normal fractional distillation.

Before discussing the novel floor and pavement compositions contemplated by this invention, it is desirable to briefly review the operations that result in the obtaining of the basic constituents used in producing these compositions.

While reference will be made more particularly to the use of propane in obtaining the basic constituents herein employed, it is to be understood that other hydrocarbon precipitants, e. g., normally gaseous hydrocarbons of from two to four carbon atoms, may likewise be used, and that propane is referred to as the preferred embodiment of the invention.

An exemplification of a preferred procedure for obtaining the primary or bonding constituents of the floor and paving compositions herein described is as follows:

A so-called "cylinder stock" or similar normal or vacuum distillation residual stock from a paraffin base crude is charged to a propane dewaxing and precipitating operation. Other solvent dewaxing methods may, of course, be used. The specific character of the charge will depend somewhat on the viscosity and pour point of the ultimately desired oil product of the propane treatment. For example, if it is the purpose of the propane treatment to obtain a so-called "bright stock" having a S. S. U. viscosity of 150 at 210° F., a cylinder stock charging material will have approximately the following specifications:

| | |
|---|---|
| Viscosity | 175 S. S. U. at 210° F. |
| Optical density (color) | 2800 |
| A. P. I. gravity | 25.6 |
| Conradson carbon residue _____ per cent | 2.6 |
| Flash (Cleveland open cup) _____ °F | 565 |

Where a bright stock having a viscosity at 210° F. of 120 S. S. U. and a zero pour point is the desired oil product of the propane treatment, the cylinder stock charge will have approximately the following specifications:

Viscosity_____ 165 S. S. U. at 210° F.
Optical density (color)_____ 2700
A. P. I. gravity_____ 25.8
Conradson carbon residue_____per cent__ 2.25
Flash (Cleveland open cup)_____°F__ 560

Such a cylinder stock charging material is preferably subjected to propane treatment in the following manner:

The charging stock is mixed with propane and fed into a warm solution tank at a temperature of approximately 65° F. The cylinder stock propane solution is then transferred into a chiller and the pressure reduced until a temperature of the order of −20 to −54° F. is obtained, depending upon the desired pour point of the ultimate oil product. The chilling is effected by evaporation of propane in the well recognized manner, and make-up propane is added during the chilling operation so that a ratio of propane to oil of approximately three to one prevails at the end of the chilling cycle and at the time of filtration.

When the cylinder stock-propane solution has been sufficiently chilled, it is transferred to a filter feed tank and thence to an appropriate filter to secure separation of the wax from the chilled solution.

The propane oil solution which has been freed from wax in the filter is then subjected to a precipitating treatment in which propane is added until the propane oil ratio is raised to approximately eight to one and the temperature of this solution is elevated to a temperature above 77° F. and preferably to a temperature of approximately the order of 155 to 165° F., which results in the precipitation of high molecular weight naturally contained viscous materials.

While in the above exemplification the solvent dewaxing is described as occurring in advance of the precipitation from the warm hydrocarbon solution, it is desired to point out that the precipitation step may be effected in advance of dewaxing without materially modifying the character of the precipitate. In fact in some instances the initial precipitation from the warm solvent solution may be preferred particularly where wax separation is effected by centrifuging.

The precipitated material, separated from the warm propane solution either before or after dewaxing of the cylinder stock, may advantageously be subjected to further treatment to separate the same into relatively higher and lower viscosity materials.

Specifically when employing a warm propane solution of the paraffin base oil product having a temperature of the order of 160° F., the precipitate may be further separated into a series of different viscosity products by first adding propane and lowering the temperature to about 80° F., whereupon the higher viscosity materials separate, i. e., those having a viscosity at 210° F. of from 3000 to 5000 S. S. U., and thereafter progressively raising the temperature to approximately 160° F. with successive separation of materials ranging in viscosity from approximately 2000 S. S. U. at 210° F. down to approximately 400 S. S. U. at 210° F.

These thus precipitated materials and similar materials precipitated from hydrocarbon solvent solutions such as a propane solution represent high molecular weight naturally contained hydrocarbons of the paraffin base oil fraction from which they have been precipitated, the paraffin base oil being characterized in that it has a content of not substantially in excess of 0.2% of asphaltic-like materials when determined according to Holde's method.

These natural high molecular weight high viscosity hydrocarbon materials which have undergone no thermal decomposition or chemical change may in some adaptations of the present invention be directly employed in the floor and pavement compositions.

For other specific adaptations of the present invention, it has been found desirable to employ chemical condensation products of these natural high molecular weight viscous hydrocarbon components of the paraffin base oil fraction. Such condensation products may advantageously be produced by air blowing the natural high molecular weight viscous materials under controlled temperature conditions.

Air blowing of the source materials results in an exothermic reaction, thus rendering the process at least partially self-sustaining without application of further extraneous heat, although it may be necessary to add extraneous heat, depending upon the particular type of source material being treated and the design of the particular vessel in which the air blowing operation is carried on. The rate of air blowing is so controlled as to maintain the temperature at approximately 450 to 575° F.

The mechanism of the chemical condensation of the complex natural viscous materials precipitated from warm hydrocarbon solutions of the paraffin base oils is not fully understood but is believed to be induced by the presence of air due to oxygen being taken up by certain of the molecules; after which molecules are condensed with a splitting off of water to yield a higher molecular weight chemically condensed product. These products may, for convenience, be termed "polymers," but it is to be understood that such designation is not intended to signify that they have resulted wholly from the union of like molecular structures.

The following represent typical illustrations for the production of the basic constituents contemplated for use in producing floor and paving compositions in accordance with the instant invention.

(a) A natural high molecular weight viscous precipitate was derived from a paraffin base cylinder stock in the manner hereinabove outlined, and represents the heavier molecular weight portion separated from the overall warm propane solution precipitates at a temperature of approximately 80° F.

These natural occurring precipitated materials had the following properties:

Visc. S. S. U. at 210° F_____ 5250
Penetration 100 g. total wt. (A. S. T. M.
  D5-25) cm.×10⁻²___ Too soft to give a reading
Ball and ring softening point (A. S. T. M.
  D36-26)_____°F__ Below 80
Molecular wt. (avg.)_____ 1380
Iodine No. Wijs method_____ 57
Carbon atoms per double bond (avg.)_____ 32

Starting with this source material, the same was charged to a suitable apparatus for air blowing and initially heated to a temperature of approximately 500° F. accompanied by the introduction of air.

Care was exercised to avoid elevation of the temperature to a degree that would cause flashing. The air blowing in this case was conducted for approximately two hours with the temperature maintained within the range of from 480° to 500° F. This operation resulted in the production of a condensation product having the following characteristics:

Visc. S. S. U. at 210° F.
    Too viscous for ready determination
Penetration 100 g. total wt. (A. S. T. M.
    D5–25) cm.×10$^{-2}$_____ 101
Ball and ring softening point (A. S. T. M.
    D36–26) _____°F__ 115
Molecular weight average_____ 1900
Iodine No. Wijs method_____ 41
Carbon atoms per double bond (avg.) _____ 44

It is to be noted that this product possessed a lower iodine number, a lower penetration, a higher softening point, and a much higher molecular weight than did the source material from which it was derived by condensation in the presence of air.

(b) The same viscous source material was used as in illustration a. The air blowing was conducted under conditions similar to those in illustration a except that the air blowing was continued for a period of approximately nine hours. The resulting condensation product was found to possess the following characteristics:

Visc. S. S. U. at 210° F.
    Too viscous for ready determination
Penetration 100 g. total wt. (A. S. T. M.
    D5–25) cm.×10$^{-2}$_____ 23
Ball and ring softening point (A. S. T. M.
    D36–26) _____°F__ 218
Molecular weight average_____ 2130
Iodine No. Wijs method_____ 39
Carbon atoms per double bond (avg.) _____ 46

(c) The source material for this operation differed somewhat from the source materials of illustrations a and b above in that it constituted a less viscous portion of the material which had been separated from the overall warm propane precipitate at a temperature of approximately 150° F. This somewhat less viscous source material had the following characteristics:

Visc. S. S. U. at 210° F_____ 746
Penetration 100 g. total wt. (A. S. T. M.
    D5–25) cm.×10$^{-2}$___ Too soft to give a reading
Ball and ring softening point (A. S. T. M.
    D36–26) _____°F__ Below 80
Molecular weight average_____ 1090
Iodine No. Wijs method_____ 43
Carbon atoms per double bond (avg.) ____ 42

This viscous oil precipitate was subjected to air blowing in a manner comparable to that set forth in illustration a above, with the exception that during the latter stages of the air blowing the temperature was caused to rise to approximately 520° F. and the air blowing was continued for approximately 15 hours. The resulting condensation product thus produced possessed the characteristics shown in the following table:

Visc. S. S. U. at 210° F.
    Too viscous for ready determination
Penetration 100 g. total wt.
    (A. S. T. M. D5–25) cm.×10$^{-2}$__ 75
Ball and ring softening point
    (A. S. T. M. D36–26) _____°F__ 147
Molecular weight average_____ 1990
Iodine No. Wijs method_____ 33
Carbon atoms per double bond (avg.) _____ 55

(d) The source material in this illustration constitutes a high molecular weight viscous material separated from propane separated wax by treatment of the wax with additional propane and precipitating the high molecular weight viscous hydrocarbons from the warm propane wax solution at a temperature of approximately 165° F. This source material had characteristics as follows:

Visc. S. S. U. at 210° F_____ 543
Penetration 100 g. total wt. (A. S. T. M.
    D5–25) cm.×10$^{-2}$__ Too soft to give a reading
Ball and ring softening point
    (A. S. T. M. D36–26)_____°F__ 106
Molecular wt. average_____ 1190
Iodine No. Wijs method_____ 35.9
Carbon atoms per double bond (avg.) _____ 51

This viscous source material derived from wax was air blown in a manner comparable to that set forth under (a) above, with the exception that in the latter stages of the air blowing the temperature was caused to rise to approximately 570° F. and the blowing was continued for a period of approximately 22 hours, at which time the resulting product had characteristics as follows:

Visc. S. S. U. at 210° F.
    Too viscous for ready determination
Penetration 100 g. total wt.
    (A. S. T. M. D5–25) cm.×10$^{-2}$_____ 41
Ball and ring softening point
    (A. S. T. M. D36–26)_____°F__ 315
Molecular wt. average_____ 2200
Iodine No. Wijs method_____ 35.2
Carbon atoms per double bond (avg.) _____ 52

From the foregoing illustration, it is apparent that floor and paving compositions of a wide variety of specific characteristics may be obtained from a paraffin base oil stock for use in accordance with the present invention.

A typical high molecular weight naturally contained viscous precipitate separated from a warm propane solution of a paraffin base cylinder stock shows the following penetration characteristics:

Penetration (A. S. T. M. D–5–25), cm.×10$^{-2}$

| Temp., ° F. | 100 g. total wt. |
|---|---|
| 30 | 86 |
| 40 | 174 |
| 50 | 206 |
| 60 | 302 |
| 70 | |

A typical condensation product condensed from naturally contained high molecular weight viscous materials precipitated from a warm propane solution of a paraffin base stock shows the following penetration characteristics:

Penetration (A. S. T. M. D–5–25), cm.×10$^{-2}$

| Temp., ° F. | 100 g. total wt. |
|---|---|
| 30 | 19 |
| 40 | 21 |
| 50 | 24 |
| 60 | 26 |
| 70 | 32 |
| 80 | 39 |
| 90 | 42 |
| 100 | 61 |

All of the foregoing materials are virtually completely soluble in 88° Bé. petroleum naphtha, the non-polar solvents such as benzene, toluene, xylene, chloroform, carbon tetrachloride, and carbon disulfide. These materials are, however, highly resistant to acids and alkalies.

The type of aggregate or filler used in preparing floor and paving compositions utilizing the foregoing illustrated binding materials will depend largely upon the conditions of service to which a particular floor or paving is to be subjected. Various fillers, such as sand, mineral aggregate, granular limestone, Portland cement, dolomite dust, and, in some instances, clay, may be used. Generally speaking, when an acid-proof floor or tile is desired, the composition should be free from limestone or other acid-soluble components. For such uses, a siliceous filler may be advantageously employed.

A very desirable composition for application as a mastic flooring or paving material may be constituted as follows: approximately 40 to 50% of a chemical condensation product having specifications generally conforming to those given under illustration b above, 5 to 10% of a natural viscous material precipitated from the paraffin base oil, having the characteristics set forth for the uncondensed product in illustration $a$ above, and from 40 to 50% of mineral aggregate or suitable filler.

This mastic may be applied by heating to permit the same to acquire sufficient fluidity to be poured and properly worked into place. After it has been smoothed out and properly worked, the surface may advantageously be sprinkled with a finely powdered siliceous material, such as powdered pumice stone, or the like. Alternatively, a surface finish may be imparted to the mastic floor or paving by applying an emulsion of one of the materials contemplated by the present invention in water, the condensation product of example $d$ above being suitable for this purpose. Emulsification may be effected with any suitable emulsifying agent, such, for example, as ammonium stearate.

Drying oils may be incorporated with the chemical condensation products and fillers if desired. Such mixtures have been found to give an improved surface finishing for floors and paving compositions.

Various forms of rubber may also be incorporated along with the condensation products to provide floor and paving compositions having superior properties.

The character of the aggregate used and the conditions to which the floor or paving is to be subjected will govern the selection of the binding ingredient used in forming the composition. It is within the contemplation of the invention to employ admixtures of one or more of the materials having similar physical and chemical characteristics to those for which illustrative exemplary data has been given in illustrations $a$ to $d$ above.

Suitable floor and paving compositions may also be produced without the use of fillers. In such compositions the novel condensation products of the present invention are mixed only with drying oils and applied as such. The resulting surfaces are quite hard and thus are particularly to be desired in certain applications of the invention.

The acid-resistant compositions of the present invention are particularly applicable for floors in laboratories, chemical plants, storage battery rooms, and other places where contact with acids and alkalies may be expected.

The mastic composition may be applied over wooden floors or over concrete surfaces.

In the production of floor tiles, the condensation products, of which examples are set forth in illustrations $a$ to $d$ above, may be suitably combined with appropriate fillers and there may also be added a supplemental hardening material. In fact, combinations of these condensation products with gilsonite and coumarone-indene resins give good results in producing molded floor tile. Such compositions may contain appropriate mineral fillers and a coloring pigment.

Various methods may be used in producing the tile, although they are preferably molded under pressure.

Where more flexible tile, which is adapted to be adhesively held in affixed position, is desired, they may be produced by introducing the components of the mixture into a Banbury mixer at an elevated temperature and the hot material rolled out between sheet rolls which may be calendered to the desired thickness and then cut into required tile size, and cooled.

A very serviceable tile can be produced from a mixture of from 60 to 80 parts of clay and from 40 to 20 parts of a condensation product, such as those for which the specifications are given in illustrations $a$ and $b$ above.

Paving blocks may be produced in accordance with the present invention from a coarse aggregate bonded by between 10% and 40% by weight of a condensation product conforming to the general specifications given under the illustration $b$ or $d$ above. The coarse aggregate should pass through a screen having one-quarter inch diameter openings. It is also desirable to have an additional powdered or finely granulated filler such as limestone, of which 40% to 50% will pass through a 200-mesh screen. The filler, coarse aggregate, and bonded material should be well mixed and heated to a temperature somewhat above 250° F. and compressed in molds under pressures of the order of several tons per square inch.

Expansion joints for use in concrete pavements may be advantageously produced in accordance with the present invention and, therefore, are contemplated within the purview of this invention.

One of the great difficulties with expansion joints of the prior art has been their tendency to crack in cold weather, oxidize and lose their ductility, pull away from the concrete, and the commonly observed tendency to bulge out in hot weather.

In accordance with the present invention, it is possible to produce expansion joints which overcome these objections. In these instances, both organic and inorganic fillers may be used. Among organic fillers may be mentioned granulated cork, sawdust, cotton stalks, flax, and the like. Other fillers, such as shredded rags, vegetable fibers, asbestos fibers, and the like may be used.

A particularly advantageous composition for expansion joints comprises from 15 to 40% of finely divided mineral matter, 10 to 15% latex rubber, and the balance in chemical condensation product conforming to the specifications given under illustrations $b$ and $d$ above.

It is, of course, also possible to produce expansion joints by laminated layers of impregnated fabric, and for this purpose the fabric or felted layers may be impregnated with one or more of the materials, specifications for which are set forth in illustrations *a* to *d* above.

Considerable difficulty has been experienced heretofore in the handling and transporting of expansion joints in cold weather. Due to the inherent ductility of expansion joints of the present invention, even at exceedingly low temperatures, this objection is entirely obviated.

Combinations of the novel chemical condensation compounds hereinabove described with drying oils and fibrous fillers have been found to have considerable utility as caulking compounds. Compounds for this use prepared from the product of illustration *b* above, using linseed oil, soyabean oil, and asbestos filler, are excellent caulking compounds having but little tendency to flow, surface drying readily, and retaining their flexibility and adhesiveness for extended periods.

By properly blending the condensation products forming the bonding material in the expansion joint, the same may be rendered substantially permanently adhesive, as well as cohesive, throughout. In such instances, a thin paper layer may be adhesively held to the sides of the joint, to be removed at the time of application, so that the expansion joint will be more or less permanently adhesively bonded to the concrete of the paving.

Rail fillers may also be produced in a manner similar to that for producing expansion joints, as well as preformed planking, applicable for use on bridges and like surfaces.

Having thus described the invention, what is claimed as new is:

1. A floor and paving composition comprising a suitable filler permanently bonded by a chemical condensation product derived from a naturally contained high molecular weight viscous hydrocarbon material precipitated from a warm propane solution of a propane dewaxed cylinder stock derived from a paraffin base oil by air blowing at a temperature within the range of from about 450° F. to about 575° F., said chemical condensation product having a viscosity above 2000 S. S. U. at 210° F. and being substantially 98% soluble in 88° Baumé naphtha.

2. A floor and paving composition comprising an acid insoluble filler permanently bonded by a chemical condensation product derived from high molecular weight naturally contained hydrocarbons precipitated from a warm solution of a paraffin base oil product in a normally gaseous hydrocarbon solvent having from two to four carbon atoms by air blowing at a temperature within the range of from about 450° F. to about 575° F., said chemical condensation product having a viscosity above 2000 S. S. U at 210° F. and being substantially 98% soluble in 88° Baumé naphtha.

3. A floor and paving composition comprising a mineral aggregate and a filler permanently bonded by a chemical condensation product derived from high molecular weight naturally contained hydrocarbons precipitated from a warm solution of a paraffin base oil product in a normally gaseous hydrocarbon solvent having from two to four carbon atoms by air blowing at a temperature within the range of from about 450° F. to about 575° F., said chemical condensation product having a viscosity above 2000 S. S. U. at 210° F. and being substantially 98% soluble in 88° Baumé naphtha.

4. A floor tile comprising from 60 to 80% clay and from 20 to 40% of a chemical condensation product derived from high molecular weight naturally contained hydrocarbons precipitated from a warm solution of a paraffin base oil product in a normally gaseous hydrocarbon solvent having from two to four carbon atoms by air blowing at a temperature within the range of from about 450° F. to about 575° F., said viscous material having a viscosity above 400 S. S. U at 210° F. and being approximately 98% soluble in 88° Baumé naphtha.

5. A paving block comprising a coarse mineral aggregate and a finer granular filler bonded together by approximately 10% by weight of a chemical condensation product derived from high molecular weight naturally contained hydrocarbons precipitated from a warm solution of a paraffin base oil product in a normally gaseous hydrocarbon solvent having from two to four carbon atoms by air blowing at a temperature within the range of from about 450° F. to about 575° F., said chemical condensation product having a viscosity above 2000 S. S. U. at 210° F. and being substantially 98% soluble in 88° Baumé naphtha.

WILBERT B. McCLUER.
RALPH W. HUFFERD.
FRANK J. PHILIPPBAR.